Figure 1:
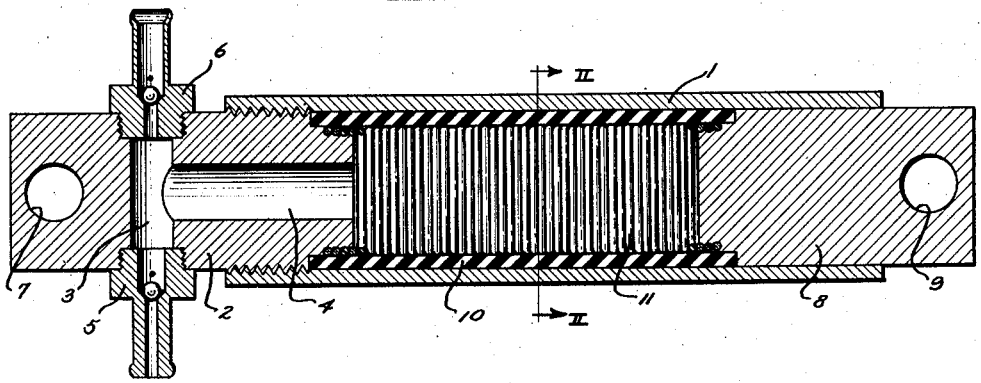

Sept. 8, 1959 N. L. ETTEN 2,902,944
PUMP
Filed Dec. 14, 1956

Inventor
NICHOLAS L. ETTEN

By *[signature]* Attys

United States Patent Office 2,902,944
Patented Sept. 8, 1959

2,902,944

PUMP

Nicholas L. Etten, Cedar Falls, Iowa, assignor to Chamberlain Corporation, Waterloo, Iowa, a corporation of Iowa Application December 14, 1956, Serial No. 628,291

5 Claims. (Cl. 103—148)

This invention relates to improvements in a pump, and more particularly to a fluid pump capable of delivering either a gas or a liquid under pressure, the pump being highly desirable for use in connection with apparatus for the spraying of gaseous, vaporous or liquid material for the purpose of pumping fluids that are highly corrosive to metal parts or may otherwise injure the metal parts, and for many other and various purposes as will be apparent to one skilled in the art.

In the past, many and various types of pumps have been developed and some of these were capable of handling corrosive fluids, but in all instances of which I am aware, these formerly known pumps were objectionably complicated in construction, embodying an undesirable number of parts, and required rather close machining operations. This was particularly true wherein a piston-like element was utilized in the pumps, and a close tolerance piston fit was essential to proper operation of the pump. Also, where the pump was intended to handle corrosive liquids and the like, exceptionally close machining of parts to insure a tight fit was essential. Such piston fits and machining of various parts to close tolerances resulted in objectionably high cost both in manufacture and later maintenance of the pump, to say nothing of the initial investment in the pump.

With the foregoing in mind, it is an important object of the instant invention to provide a pump which embodies a minimum of parts, is extremely simple in construction and assembly, and may be both economically manufactured and used throughout an indefinite period, since the pump includes very few parts that may become out of order.

Also, an object of this invention is the provision of a pump embodying a simple form of a fluid moving or volume changing assembly which comprises merely a resilient tube with a coil spring disposed inside that tube to prevent undue collapse of the tube.

A further feature of the invention resides in the provision of a pump having a simple fluid moving assembly embodying merely a resilient tube with a coil spring inside the tube, and reciprocable means to alternately expand and contract the assembly in a longitudinal direction.

Still another feature of the instant invention resides in the provision of a simple form of fluid pump, wherein the fluid moving assembly comprises merely a resilient tube with a coil spring inside that tube, and means disposed intimately around the tube in its contracted state to prevent lateral or radial expansion of the tube during the pumping operation.

It is also an object of this invention to provide a fluid pump which, while incorporating reciprocatory means, nevertheless requires but little machining of any parts, and that to relatively great tolerances, and no fine machining to establish what is customarily known as piston fit.

A further object of the instant invention resides in the provision of a fluid pump embodying a hollow volume changing assembly to effect the pumping action, and which assembly is so constructed that none of the fluid being pumped can enter the assembly.

Still another object of the instant invention is the provision of a fluid pump capable of developing relatively high pressures and yet so constructed as to occupy a minimum space whereby the pump, exclusive of its drive means, may be mounted in substantially any desirable location without interfering with other parts of the apparatus with which the pump is associated.

Figure 3:
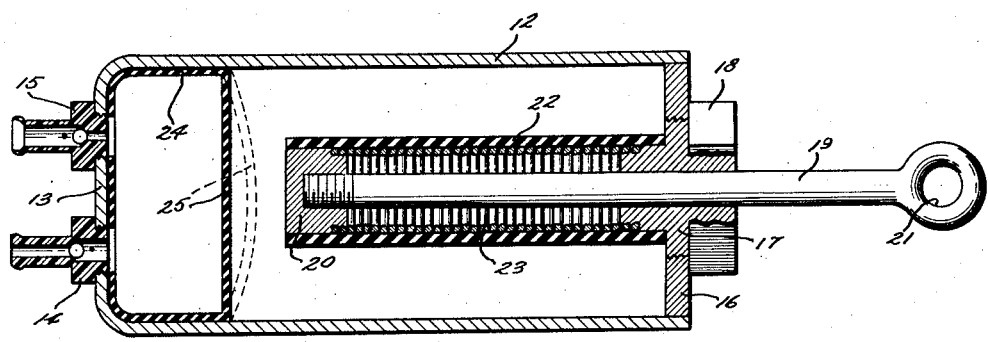
Figure 2:
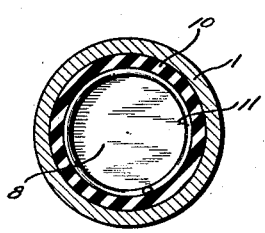

While some of the more salient features, characteristics and advantages of the instant invention have been above pointed out, others will become apparent from the following disclosures, taken in conjunction with the accompanying drawing, in which Figure 1 is a central vertical sectional view, with parts shown in elevation, through a pump embodying principles of the instant invention;

Figure 2 is a transverse vertical sectional view taken substantially as indicated by the line II—II of Figure 1, looking in the direction of the arrows; and Figure 3 is a central vertical sectional view, with parts shown in elevation, of a pump of somewhat different construction, but also embodying the principles of the instant invention.

As shown on the drawings:

In the first illustrated embodiment of this invention, seen in Figures 1 and 2, there is shown a pump comprising a casing 1 in the form of a rigid tube of metal or other suitable material capable of withstanding the pumping pressures. This tube is open at both ends, and one end is provided with internal threads for removable engagement with an end member or plug 2. This plug is provided with a transverse diametral passage 3 in direct communication with a longitudinal passage 4 extending through the threaded portion of the plug. Fluid enters one end of the passage 3 and is forced out the other end of that passage by the pumping action under pressure. At the inlet end of the passage 3, a suitable check valve assembly 5 is provided which is constructed so as to prevent the exit of fluid through that end of the passage 3; and likewise, at the exit end of the passage another check valve assembly 6 is provided and so constructed as to prevent the entrance of fluid. Outwardly beyond the check valve assemblies 5 and 6, the end member or plug 2 may be provided with an aperture 7 to accommodate any suitable form of mounting means to support the pump in operative position.

At the opposite end thereof, the casing or tube 1 accommodates a plug or piston 8 which reciprocates within the smooth end of the casing, and externally of the casing may be provided with a suitable aperture 9 for connection with any desired form of driving mechanism for actuating the pump. The plug or piston 8 may be considered the driving means for the pump.

The fluid moving or volume changing assembly inside the casing 1 comprises a resilient tube 10 which may be of rubber, synthetic rubber, or other suitable material. Inside that tube is a coil spring 11 and the coils of this spring are preferably in contact with each other when the spring is in its contracted state as seen in Figure 1. The resilient tube 10 is sealed in a fluidproof manner to a diametrally reduced portion of each of the end piece or plug 2 and the piston 8; and the spring is secured at opposite ends to a further reduced portion of the plug 2 and the piston 8, as clearly seen in Figure 1.

In operation, the instant pump is extremely simple. The piston 8 reciprocates in the smooth open end of the casing 1, and as it moves outwardly it longitudinally expands the resilient tube and spring assembly, causing fluid to be drawn inwardly through the check valve assembly 5 and the passage 4 to the interior of the volume changing assembly. On the next inner movement, the assembly is contracted and a portion of the fluid thus drawn in is forced out through the check valve assembly 6 under pressure. This alternate expansion and contraction of the volume changing assembly may be accomplished at a very rapid rate of speed, and consequently the pump is capable of developing relatively high pressures, exceeding one hundred twenty-five pounds per square inch. The pumping action is positive, in view of the fact that the rigid casing 1 prevents lateral or radial expansion of the resilient tube 10 on the pressure stroke.

It will be especially noted that little, if any, machining of parts is necessary, it being a simple expedient to thread one end of the casing 1, and provide the essential passages and threaded openings in the end piece 2. The piston 8, since fluid can never reach the external side of this piston, need not be machined to a close tolerance consistent with what is known as normal piston fit, it being only necessary that this piston or plug 8 slide freely within the open end of the casing 1. Thus, it will be especially noted that the pump is extremely economical in construction, requires substantially no maintenance throughout its life, and has few parts to become out of order at any time.

In Figure 3, I have shown a somewhat different form of construction of a pump embodying features of the instant invention. In this case, the pump is highly resirable for the delivery of corrosive fluids under pressure, or fluids that may otherwise be injurious to metal parts. In this instance, there is an elongated cup-like casing 12 having an end 13 that is closed except for an inlet port controlled by check valve assembly 14, and an outlet port controlled by check valve assembly 15. In view of the fact that this pump is designed to handle liquids that may corrode or otherwise injure metallic parts, the two check valve assemblies 14 and 15 are preferably made of an inert thermo-plastic material, nylon being a satisfactory example.

The opposite end of the casing 12 may be closed by a suitable end member 16 brazed, welded, or equivalently secured in the open end of the casing. This end closure 16 has a central threaded opening to accommodate a double-ended bushing 17. A threaded end of this bushing extends without the casing, and may accommodate a relatively large nut 18 which gives added assurance that the bushing will stay in operative position and not become accidentally loosened.

The bushing 17 is centrally apertured to accommodate a drive rod 19 which carries on its inner end inside the casing a solid plug 20. The outer end of the drive rod may be in the form of an eye, as indicated at 21, or otherwise formed for connection to any suitable drive means or prime mover. Inside the casing 12 is a volume changing or fluid moving assembly of the same character as described in connection with the first embodiment of the instant invention, and comprising a resilient tube 22 with a coil spring 23 inside that tube. One end of the tube is sealed in fluid tight manner to the plug 20 on the drive rod 19, and the other end of the tube is sealed in fluid tight manner to the inner portion of the bushing 17. Thus, the fluid being pumped cannot enter inside the tube 22. The spring is likewise connected at one end to the plug 20 and at the other end to the inward extension of the bushing 17.

The interior of the casing 12 may be provided with a lining 24 of any suitable inert material, rubber, synthetic rubber, a suitable plastic material, or other substance that is inert to the particular fluid being pumped. This lining may have an opening at each of the ports controlled by the check valve assemblies 14 and 15, and may extend as far within the casing as may be desired. In the illustrated instance, I have shown the lining as terminating ahead of the fluid moving assembly in the form of a diaphragm 25 extending across the casing.

The pump illustrated in Figure 3 will operate, of course, whether or not there is a lining 24 and whether or not there is a diaphragm 25 in the casing 12. During operation, upon an outward movement of the drive rod 19, the volume changing assembly embodying the tube 22 and spring 23 will be contracted, and as illustrated in Figure 3, the tube is in its fully contracted position. On an inward movement of the drive rod 19, the volume changing assembly will be longitudinally lengthened, thereby reducing the volume within the casing. The diaphragm 25 will have the full line position when the device is not operating. Upon the suction stroke or outward movement of the drive rod 19, the diaphragm will be flexed inwardly as indicated by dotted lines, and consequently fluid will be drawn within the casing through the port controlled by the check valve assembly 14. Upon an inward movement of the drive rod, and the lengthening of the volume changing assembly, the diaphragm will be flexed in the opposite direction and fluid will be expelled through the port controlled by the check valve assembly 15.

The operation may be extremely rapid, and high pressures developed. Here again, there is a construction where little, if any, accurate machining of parts is required, and where there is no necessity of constructing any parts to close tolerances or providing a piston fit. It is a simple expedient to remove the nut 18, remove the bushing 17, carrying the entire fluid moving assembly therewith any time inspection of parts is desired.

With the arrangement shown in Figure 3, there is no possibility of the fluid being pumped ever contacting metallic parts and injuring them by corrosion or otherwise.

In the instance of the structure of Figure 3, it is not necessary to provide means to prevent lateral or radial expansion of the resilient tube 22 during the power stroke because there is no fluid ever inside this tube and therefore no reason why it should expand. But even though it did expand, there would be proportionate volume change within the casing to exercise a proper pumping action.

From the foregoing, it is apparent that I have provided a highly economical, long-lived, and simple form of pressure pump, capable of operating at high speeds, and capable of producing relatively high pressures. Substantially any form of fluid may be forcefully delivered by the pump.

It will be understood that modifications and variations may be effected without departing from the scope of the novel concepts of the present invention.

I claim as my invention:

1. In a pump, a fluid moving assembly comprising a resilient tube, a coil spring inside said tube, a movable imperforate drive plug secured to said tube and spring at one end thereof, and an apertured plug connected to the opposite end of said tube and spring, said drive plug being reciprocable to alternately expand and contract said tube and spring lengthwise thereof, and rigid means intimately surrounding said tube in its contracted state to prevent lateral expansion thereof.

2. In a pump, a casing, fluid outlet and inlet means at one end of said casing, valve means controlling the flow of fluid through said outlet and inlet means, a resilient tube in said casing, a coil spring inside said tube, an apertured plug member connected to one end of the tube and spring and a drive member reciprocable through an end of said casing and connected to said tube and spring at the opposite end thereof to alternately stretch and contract the same, said resilient tube having an external diameter when contracted substantially equal to the inside diameter of said casing whereby said casing prevents lateral expansion of the resilient tube.

3. In a pump, a tubular casing, drive means operable through an end of said casing, plug means secured to the other end of said casing and being passaged for the entry and exit of fluid being pumped, check valve means controlling the entry and exit of fluid, and a volume changing assembly comprising a resilient tube entirely contained within said casing, and a coil spring surrounded by said tube in contact with the inner walls thereof, one end of said assembly being sealed to said drive means in fluid tight relation therewith for expansion and contraction of the assembly, and the other end being sealed to the plug means in fluid tight relation therewith.

4. In a pump, a casing having an inlet and an outlet port at one end, check valves controlling fluid flow through said ports, a lining in said casing inert to the fluid to be pumped, an apertured plug member carried at the opposite end of the casing, drive means reciprocal through said plug member, an imperforate plug member mounted at one end of the drive means, and a volume changing assembly comprising a resilient tube in said casing, and a coil spring in said tube, said tube being imperforate and sealed at opposite ends to the plug members in fluid tight relation therewith.

5. In a pump construction which includes a tubular casing, a fluid moving assembly comprising a resilient tube entirely contained within said casing, a coil spring surrounded by said tube in contact with the inner walls thereof, a perforated plug member rigidly carried by said casing at one end thereof and secured to said tube and spring in fluid tight contact therewith, and an imperforate plug member movable toward and away from the opposite end of the casing and attached to said tube and spring in fluid tight contact therewith, the inner walls of the casing surrounding the tube in uninterrupted relation therewith.

References Cited in the file of this patent

UNITED STATES PATENTS

| | | |
|---|---|---|
| 1,057,196 | Wilkins | Mar. 25, 1913 |
| 1,454,886 | Giesler | May 15, 1923 |
| 1,923,740 | Mueser | Aug. 22, 1933 |
| 2,189,554 | Schweiss | Feb. 6, 1940 |
| 2,299,315 | Evans | Oct. 20, 1942 |
| 2,791,969 | Berliner | May 14, 1957 |